United States Patent
Okamoto et al.

(10) Patent No.: US 10,711,633 B2
(45) Date of Patent: Jul. 14, 2020

(54) MAIN STOP VALVE

(71) Applicant: Elliott Ebara Turbomachinery Corporation, Chiba (JP)

(72) Inventors: Shinji Okamoto, Chiba (JP); Teruo Kamijima, Chiba (JP); Ryohei Shibata, Chiba (JP); Wataru Miura, Chiba (JP)

(73) Assignee: ELLIOTT EBARA TURBOMACHINERY CORPORATION, Chiba (JP)

( * ) Notice: Subject to any disclaimer, the term of this patent is extended or adjusted under 35 U.S.C. 154(b) by 43 days.

(21) Appl. No.: 16/306,954

(22) PCT Filed: Jun. 7, 2017

(86) PCT No.: PCT/JP2017/021048
§ 371 (c)(1),
(2) Date: Dec. 4, 2018

(87) PCT Pub. No.: WO2017/213160
PCT Pub. Date: Dec. 14, 2017

(65) Prior Publication Data
US 2019/0145527 A1 May 16, 2019

(30) Foreign Application Priority Data

Jun. 10, 2016 (JP) .................. 2016-116100

(51) Int. Cl.
*F01D 21/16* (2006.01)
*F16K 31/143* (2006.01)
(Continued)

(52) U.S. Cl.
CPC ............ *F01D 17/26* (2013.01); *F01D 17/10* (2013.01); *F01D 17/145* (2013.01); *F01D 21/00* (2013.01); *F01D 21/16* (2013.01); *F16K 31/143* (2013.01)

(58) Field of Classification Search
CPC ........ F01D 17/26; F01D 17/145; F01D 21/00; F01D 21/16; F01D 17/10; F16K 31/143
(Continued)

(56) References Cited

U.S. PATENT DOCUMENTS

| 1,445,130 | A | * | 2/1923 | Cockburn | ............. F16K 31/143 251/31 |
| 2,407,982 | A | * | 9/1946 | Hanna | ..................... F01D 17/26 137/48 |

(Continued)

FOREIGN PATENT DOCUMENTS

| JP | 02-009041 Y | 3/1990 |
| JP | 02-009042 Y | 3/1990 |

OTHER PUBLICATIONS

International Search Report dated Jul. 4, 2017 for WO 2017/213160 A1.

*Primary Examiner* — Umashankar Venkatesan
(74) *Attorney, Agent, or Firm* — Abelman, Frayne & Schwab

(57) ABSTRACT

A main stop valve includes: a hydraulic cylinder; a piston arranged in a hydraulic cylinder; a valve rod connected to the piston; and a valve body connected to the valve rod and configured to block a steam passage. The main stop valve further includes: a pilot cylinder having a communication port in fluid communication with the hydraulic cylinder; a rod connected in parallel with the valve rod and configured to be inserted from one end of the pilot cylinder; a sliding ring provided on the rod; and a pilot sleeve configured to be slidably fitted into an inner surface of the pilot cylinder and
(Continued)

slidably fitted into an outer peripheral surface of the sliding ring in a section between the one end of the pilot cylinder and the communication port.

3 Claims, 9 Drawing Sheets

(51) Int. Cl.
*F01D 17/26* (2006.01)
*F01D 17/10* (2006.01)
*F01D 17/14* (2006.01)
*F01D 21/00* (2006.01)

(58) Field of Classification Search
USPC .......................................................... 251/25
See application file for complete search history.

(56) References Cited

U.S. PATENT DOCUMENTS

| | | | | |
|---|---|---|---|---|
| 2,644,485 A | * | 7/1953 | Schwendner | F16K 31/143 251/14 |
| 3,427,464 A | * | 2/1969 | Watson | G05D 13/08 290/40 R |
| 4,227,441 A | * | 10/1980 | Prochazka | F01D 17/26 91/374 |
| 4,696,452 A | * | 9/1987 | Miyagawa | F16K 31/143 251/14 |

\* cited by examiner

MAIN STOP VALVE

CROSS REFERENCE TO RELATED APPLICATIONS

This application is a national phase of PCT application No. PCT/JP2017/021048, filed on 7 Jun. 2017, which claims priority from Japanese patent application No. 2016-116100, filed on 10 Jun. 2016, all of which are incorporated herein by reference.

TECHNICAL FIELD

The present disclosure relates to a main stop valve installed at an inlet of a steam turbine or the like.

BACKGROUND

A main stop valve installed at an inlet of a steam turbine or the like is capable of being closed quickly to block steam and being opened gradually during startup to adjust the supply amount of steam. A trip and throttle (T&T) valve is generally used as such a main stop valve. For example, in the case of a hydraulic-actuation type T&T valve, hydraulic oil is supplied to a cylinder during operation, and the valve is kept open by applying a hydraulic pressure exceeding the pressing force of a spring to a piston. In an emergency, a path configured to rapidly drain the hydraulic oil from the cylinder is opened, and the piston to which the hydraulic pressure is not applied is pushed down by the pressing force of the spring, thereby closing the valve quickly.

In the meantime, when a hydraulic-actuation type T&T valve is started, the valve is gradually opened by a predetermined procedure. For example, in the case of the T&T valve in the related art described in Patent Documents 1 and 2, a valve rod is rotated by a handle operation before the supply of the hydraulic oil in a state where the valve is closed, and the action of a screw installed in the valve rod lifts (resets) the piston to a topmost portion of a cylinder. Subsequently, the hydraulic oil is supplied into the cylinder. At this time point, since the piston is already at the topmost portion of the cylinder, the piston is not raised by the hydraulic pressure, and thus, the valve remains closed. Thereafter, when the valve rod is rotated in the reverse direction by the handle operation, the valve rod is released from the piston held at the topmost portion of the cylinder by the hydraulic pressure by the action of the screw, and the valve is gradually opened.

As a problem in the above-described T&T valve, Patent Documents 1 and 2 point out that, unlike a predetermined procedure, when the hydraulic oil is supplied into the cylinder before the piston is reset, the valve is opened against the operator's will. In Patent Document 1, it has been proposed to provide a bypass flow path and a spring support sleeve engaged with a piston with respect to this problem. Meanwhile, in Patent Document 2, it has been proposed to provide a pilot relay valve configured to selectively supply hydraulic oil to a cylinder, and to move a plunger provided in a main body of the relay valve to a valve rod or displace the plunger manually.

PRIOR ART DOCUMENT

Patent Document

Patent Document 1: Japanese Utility Model Publication No. 02-009041

Patent Document 2: Japanese Utility Model Publication No. 02-009042

DISCLOSURE OF THE INVENTION

Problems to be Solved

In the T&T valves proposed in the above-mentioned Patent Documents 1 and 2, the valves are not opened even when the hydraulic oil is supplied to the cylinder before the piston is reset, and thus, the above-mentioned problem is solved. However, in the case of Patent Document 1, as indicated in Patent Document 2, the bypass flow path and the spring support sleeve make the structure of the T&T valve complicated. Also, in Patent Document 2, the structure of the T&T valve including a pilot relay valve is still complicated because the pilot relay valve is embedded in the oil supply and drainage paths of the main body of the T&T valve.

The present disclosure has been made in view of the above points. One of the objects of the present disclosure is to provide a new and improved main stop valve capable of simplifying the structure of the main body while providing a pilot mechanism.

Means to Solve the Problems

According to an aspect of the present disclosure, a main stop valve includes: a hydraulic cylinder; a piston arranged in the hydraulic cylinder; a valve rod connected to the piston; and a valve body connected to the valve rod and configured to block a steam passage. The main stop valve further includes: a pilot cylinder having a communication port in fluid communication with the hydraulic cylinder; a rod connected in parallel with the valve rod and configured to be inserted from one end of the pilot cylinder; a sliding ring provided on the rod; and a pilot sleeve configured to be slidably fitted into an inner surface of the pilot cylinder and slidably fitted into an outer peripheral surface of the sliding ring in a section between the one end of the pilot cylinder and the communication port.

In the above-described configuration, while the sliding ring and the pilot sleeve are fitted to each other in the pilot cylinder, an oil chamber in the pilot cylinder, which is in fluid communication with the hydraulic cylinder, is sealed and the hydraulic pressure is applied to the piston in the hydraulic cylinder so as to lift the valve rod and the valve body. It is possible to lift the valve body to a desired position, that is, adjust the opening degree of the main stop valve, by appropriately moving the section in which the pilot sleeve is displaced and the sliding ring is fitted into the pilot sleeve. The structure of the main stop valve provided with such a pilot mechanism may be simplified, for example, from the example of the related art.

The main stop valve may also be provided with a handle that displaces the pilot sleeve in an axial direction of the pilot cylinder.

In the above-described configuration, when the pilot sleeve is displaced by a handle operation, it is possible to operate the valve rod with a smaller force than when the valve rod is directly displaced by the handle operation.

The main stop valve may include a stopper ring fixed to the rod and a spring provided on the stopper ring. The sliding ring may be slidably mounted on the rod, and may be biased against a communication port by the spring.

In the above-described configuration, since it is possible to relatively displace the sliding ring with respect to the rod in a predetermined range, for example, when the sliding ring vibrates so as to be intermittently fitted into the pilot sleeve, the displacement of the rod may be stabilized.

DETAILED DESCRIPTION TO EXECUTE THE INVENTION

Hereinafter, a preferred embodiment of the present disclosure will be described in detail with reference to the accompanying drawings.

Figure 1:
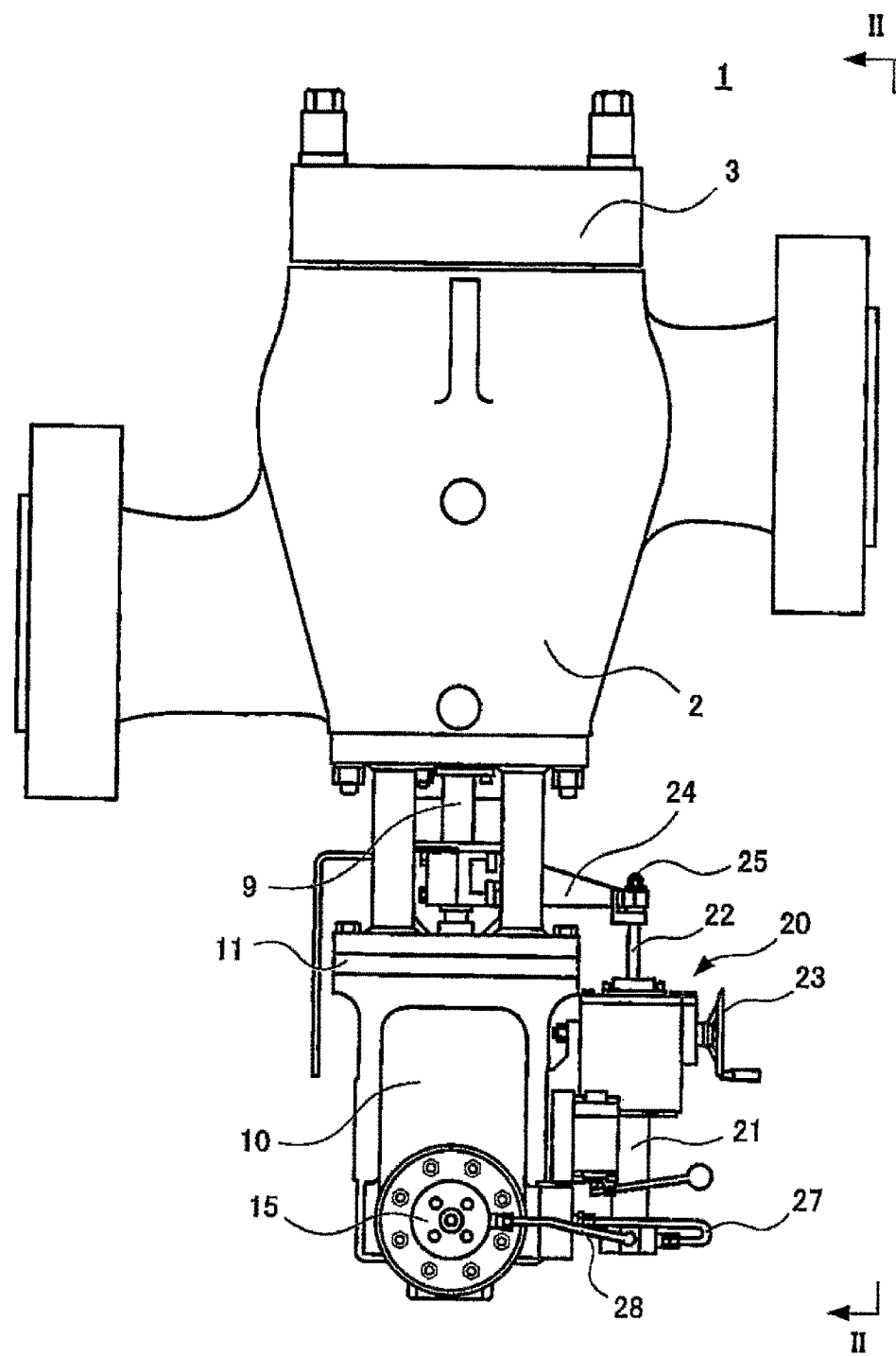
FIG. 1 is a front view of a main stop valve according to an embodiment of the present disclosure.
Figure 2:
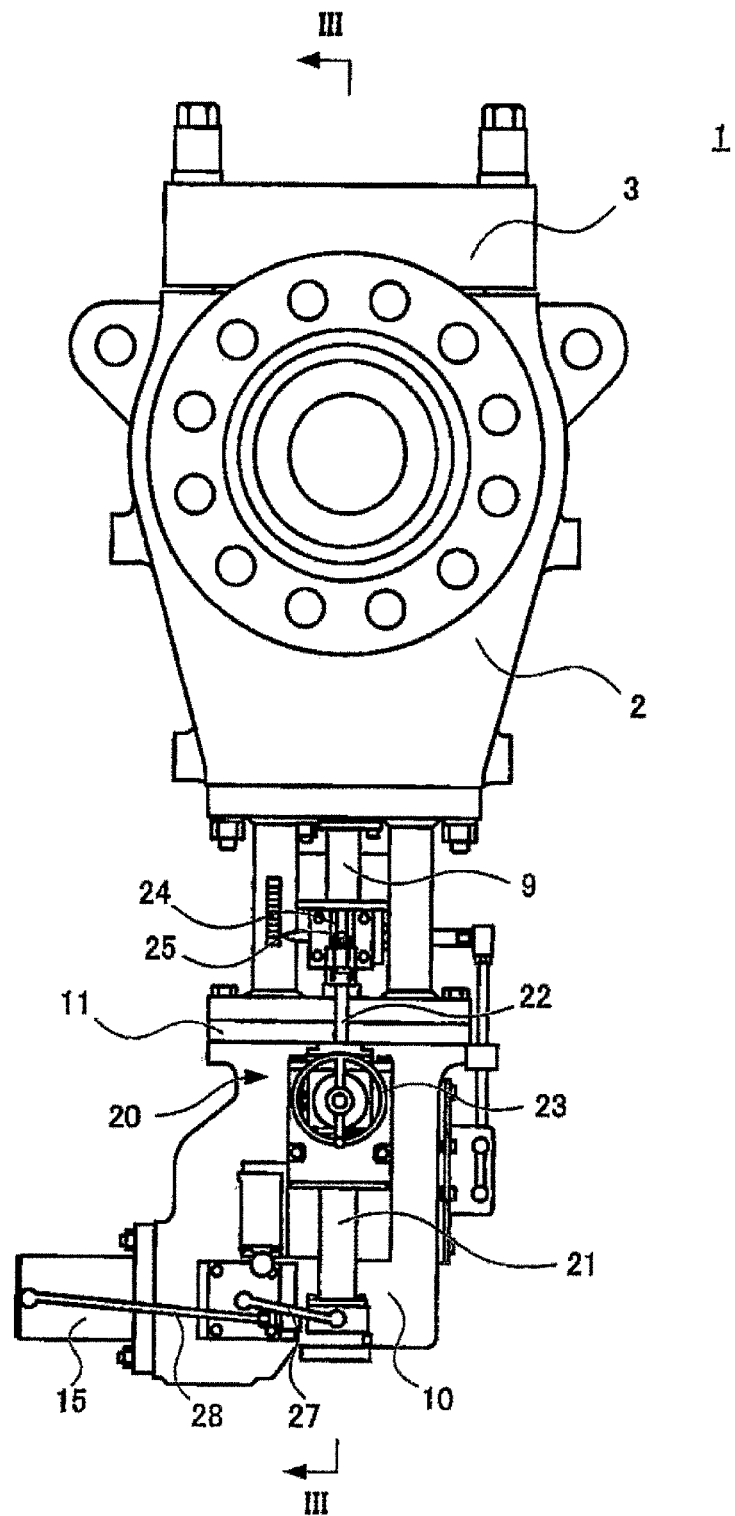
FIG. 2 is a side view of the main stop valve illustrated in FIG. 1.
Figure 3:
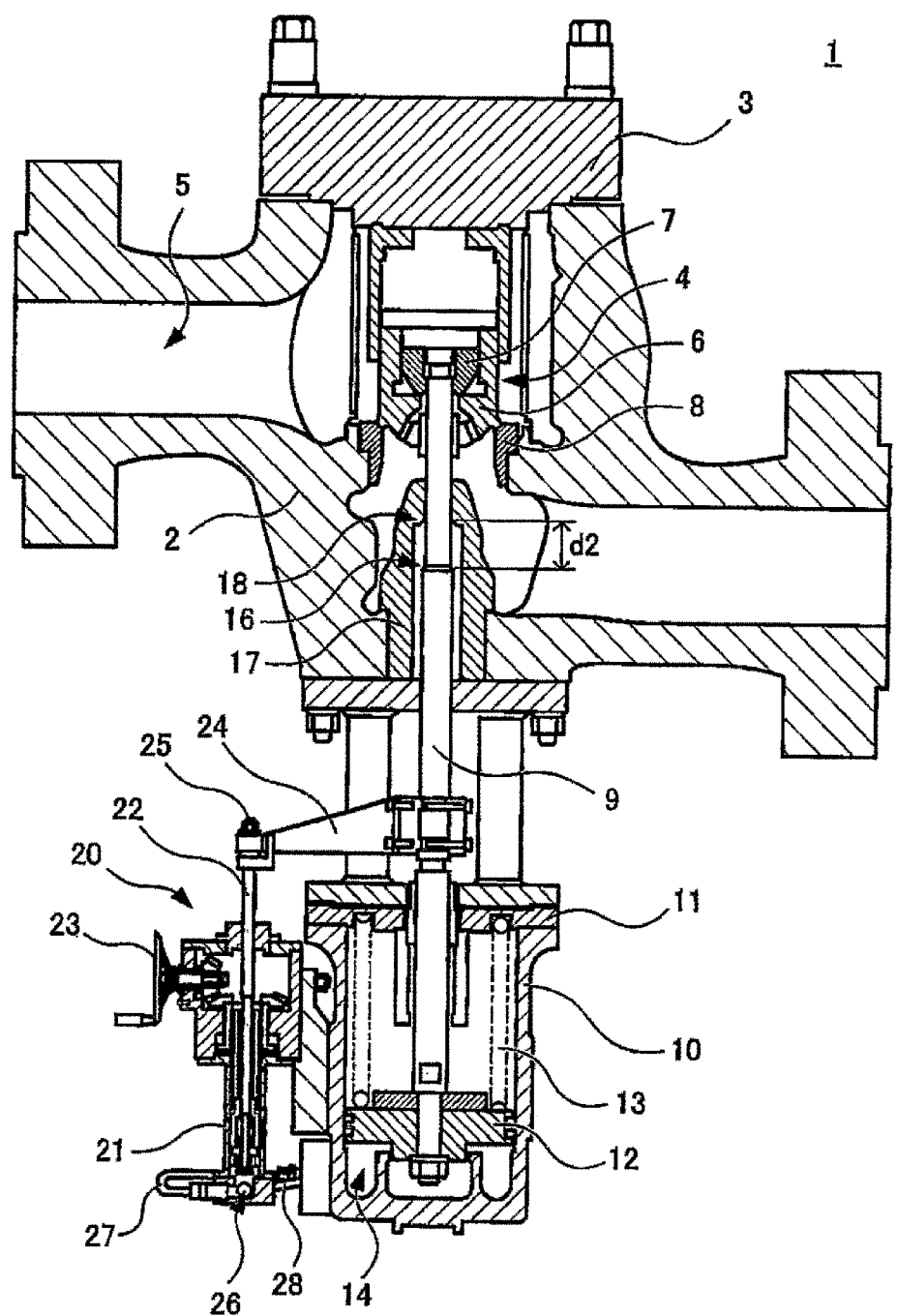
FIG. 3 is a vertical sectional view of the main stop valve illustrated in FIG. 1.

First, with reference to FIGS. 1 to 3, the overall configuration of a main stop valve 1 according to an embodiment of the present disclosure will be described. The main stop valve 1 is a hydraulic differential type T&T valve. FIG. 1 is a front view of the main stop valve 1. FIG. 2 is a side view of the main stop valve 1 (a view taken along a line II-II illustrated in FIG. 1). FIG. 3 is a vertical sectional view of the main stop valve 1 (a view taken along a line illustrated in FIG. 2).

The main stop valve 1 is a T&T valve that closes a steam passage 5 by a valve body 4 installed inside a casing 2 and a casing cover 3. As illustrated in FIG. 3, in the present embodiment, the valve body 4 includes a main valve 6 and a balance valve 7. A valve rod 9 connected to the valve body 4 is lowered, and when the valve body 4 is seated on a valve seat 8, the valve is closed, that is, the steam passage 5 is blocked. In the meantime, when the valve rod 9 is raised and the valve body 4 is lifted from the valve seat 8, the valve is opened, that is, the steam passage 5 opens. Further, in the present embodiment, as illustrated in the drawing, the main stop valve 1 is arranged so that the valve rod 9 is in a substantially vertical direction. Therefore, for the sake of convenience, the expressions "raise" and "lower" are used with respect to the displacement of the valve body 4, the valve rod 9, a piston 12, and the like, and the expressions such as an upper side and a lower side, upward and downward, top and bottom, and the like are used according to the illustrated directions. However, in another embodiment, the main stop valve 1 may be arranged so that the valve rod 9 is, for example, in a substantially horizontal direction, or the main stop valve 1 may be arranged by reversing up and down from the present embodiment. In such a case, the above expressions are appropriately changed according to the direction in which the main stop valve 1 is arranged in each embodiment.

A hydraulic cylinder 10 is provided below the casing 2 to raise and lower the valve rod 9. A piston 12 connected to the valve rod 9 and a main body side spring 13 configured to bias the piston 12 downward are arranged in the hydraulic cylinder 10 and a cylinder cover 11. As a basic operation of the piston 12, when hydraulic oil is supplied from an oil supply path (not illustrated) to a main body side oil chamber 14 formed on the lower side of the piston 12 in the hydraulic cylinder 10, an upward hydraulic pressure acts on the piston 12. When the hydraulic pressure exceeds the pressing force of the main body side spring 13, the piston 12 is raised together with the valve rod 9. Thereafter, when an emergency drainage valve provided in an oil supply unit 15 (not illustrated) is opened and the hydraulic oil in the main body side oil chamber 14 is rapidly drained, the hydraulic pressure does not act on the piston 12, and the piston 12 is pushed down rapidly due to the pressing force of the main body side spring 13. This operation is also referred to as the tripping operation of the piston 12 in the T&T valve such as the main stop valve 1.

When the piston 12 is pushed down to the lowermost position of the hydraulic cylinder 10 by the above-mentioned tripping operation, the valve body 4 is seated on the valve seat 8 due to the lowering of the valve rod 9, and the steam passage 5 is blocked. Conversely, when the piston 12 is raised together with the valve rod 9 due to the hydraulic pressure, the valve body 4 is lifted from the valve seat 8, and the steam passage 5 is opened. A shoulder unit 16 is formed in the valve rod 9 and a backseat 18 is formed in a bonnet 17 in the casing 2 so that the valve body 4 and the valve rod 9 are not raised beyond a position where the steam passage 5 is completely opened. As the shoulder unit 16 abuts against the backseat 18, the raising of the valve rod 9 is restricted. Here, a taper corresponding to the shoulder portion 16 and the backseat 18, respectively, may be formed. Therefore, when the shoulder unit 16 abuts against the backseat 18, it is possible to suppress leakage of steam through a sliding unit gap of the valve rod 9 from the casing 2.

A pilot mechanism 20 provided in the main stop valve 1 includes a pilot cylinder 21, a rod 22 configured to penetrate from one end of the pilot cylinder 21, and a handle 23. The rod 22 is also connected in parallel with the valve rod 9 using a connecting rod 24 and a nut 25. Further, since the displacements of the valve rod 9 and the rod 22 do not necessarily coincide exactly, there may be a gap in the connecting unit of the connecting rod 24 and the nut 25. Although the details will be described later, in the present embodiment, the rod 22 is basically raised and lowered together with the valve rod 9, but is not raised and lowered by the hydraulic pressure in the pilot cylinder 21. Further, the operation of the handle 23 does not raise and lower the rod 22, but raises and lowers a pilot sleeve 37 (to be described later) installed in the pilot cylinder 21 as described later.

In the above-described pilot mechanism 20, a pilot oil chamber 26 formed in the pilot cylinder 21 and the main body side oil chamber 14 in the hydraulic cylinder 10 are in fluid communication with each other via a communication pipe 27. Therefore, a hydraulic pressure which is substantially the same as that in the main body side oil chamber 14 acts in the pilot oil chamber 26. For this reason, as described later, while the hydraulic oil in the pilot oil chamber 26 is leaking in the pilot cylinder 21, the hydraulic pressure does not rise in the main body side oil chamber 14, and the position of the piston 12 is maintained. Further, in the illustrated example, the oil supply unit 15 is connected to the pilot oil chamber 26 by the communication pipe 28.

Next, with reference to FIGS. 4A to 4F, descriptions will be made on the detailed structure of the pilot mechanism 20 arranged in the main stop valve 1 illustrated in FIGS. 1 to 3, and the operation of the pilot mechanism 20 at the time of setting up the main stop valve 1.

As the elements commonly illustrated in FIGS. 4A to 4F, the pilot mechanism 20 includes a gear box 30 and a gear box cover 31 in addition to the pilot cylinder 21, the rod 22, and the handle 23 described above. A drive gear 33 connected to the handle 23 by a handle shaft 32 and a driven gear 34 engaged with the drive gear 33 are arranged inside the gear box 30 and the gear box cover 31. The driven gear 34 is connected to a trapezoidal threaded nut 35 to rotate around the rod 22 together with the trapezoidal threaded nut 35. A trapezoidal thread is formed on an inner peripheral surface of the trapezoidal threaded nut 35. The trapezoidal thread is engaged with a trapezoidal thread formed on an outer peripheral surface of a trapezoidal threaded sleeve 36 disposed inside the trapezoidal threaded nut 35. In the meantime, a key groove (not illustrated) is formed on the inner peripheral surface of the trapezoidal threaded sleeve 36, and a key joined to the rod 22 (not illustrated) is engaged with the key groove. Thus, rotation of the trapezoidal threaded sleeve 36 around the rod 22 is restricted. Further, an extended unit 38 of the pilot sleeve 37 abuts against the lower end portion of the trapezoidal threaded sleeve 36. With this arrangement, in the pilot mechanism 20, the pilot sleeve 37 may be displaced in the axial direction of the pilot cylinder 21 by the rotation of the handle 23. Hereinafter, for the sake of simplicity, the displacement of the pilot sleeve 37 will be described as being raised and lowered according to the illustrated direction. It is the same as the valve rod 9 and the like described above that this expression is appropriately changed in another embodiment in which the direction in which the main stop valve is disposed is different.

In the present embodiment, the trapezoidal threaded sleeve 36 of the pilot mechanism 20 is not connected to the rod 22. The rod 22 is raised and lowered together with the valve rod 9 on the main body side by the connection using the connecting rod 24 and the nut 25 described above independently of the raising and lowering of the trapezoidal threaded sleeve 36 and the pilot sleeve 37 by the operation of the handle 23. The rod 22 is supported so as to be able to be raised and lowered by a rod bush 39 provided on the gear box cover 31.

The pilot sleeve 37 may be slidably fitted into the inner peripheral surface of the pilot cylinder 21 and may be slidably fitted into the outer peripheral surface of the sliding ring 40 provided on the rod 22 in a section S of the axial direction of the pilot cylinder 21. As illustrated in the drawing, the section S is located between the upper end portion of the pilot cylinder 21 into which the rod 22 is inserted and the communication port 41 provided in the lower portion of the pilot cylinder 21, as described later. Further, as illustrated in FIGS. 4A to 4F, the section S moves as the pilot sleeve 37 is raised and lowered by the operation of the handle 23. The sliding ring 40 is provided near the lower end portion of the rod 22. More specifically, the sliding ring 40 is slidably mounted on the rod 22 and is biased downward by a spring 42, that is, toward the communicating port 41. The spring 42 is provided on the stopper ring 43 fixed to the rod 22.

A rod guide 44 is provided in the lower end portion of the rod 22, further below the sliding ring 40. The rod guide 44 is slidably fitted into the inner peripheral surface of the pilot cylinder 21 so as to facilitate the rod 22 to be raised and lowered along the pilot cylinder 21. Further, since the rod guide 44 is not a piston, it does not interfere with the flow of hydraulic oil in the pilot oil chamber 26. That is, in the pilot oil chamber 26, the hydraulic oil flows through the rod guide 44. The lower end of the pilot cylinder 21 is closed by a cylinder cover 45 in which a communication port 41 is formed to communicate with the main body side oil chamber 14 through the communication pipe 27.

Figure 4A:
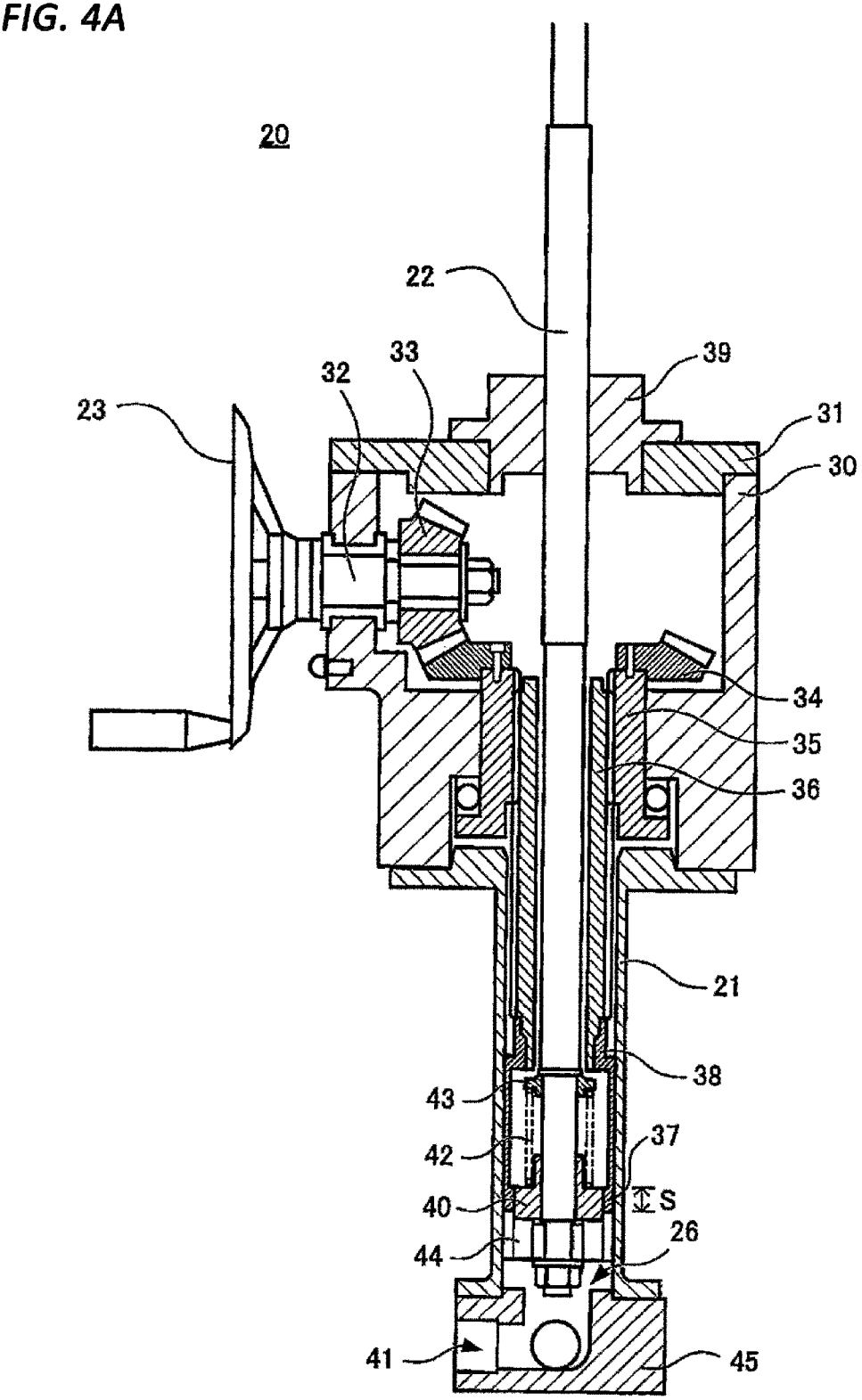
FIG. 4A is a view for explaining the detailed configuration and operation of a pilot mechanism arranged in the main stop valve illustrated in FIGS. 1 to 3.

FIG. 4A illustrates a state in which the handle 23 is rotated to lower the pilot sleeve 37 to a predetermined position after the tripping operation of the piston 12 (the operation of being rapidly pushed down by the pressing force of the main body side spring 13 in an emergency or the like as described above). Hereinafter, this state is also referred to as a state in which the pilot mechanism 20 is reset. At this time, the sliding ring 40 is located in the section S in a state of being pushed down by the pressing force of the spring 42, and the outer peripheral surface of the sliding ring 40 is fitted into the inner peripheral surface of the pilot sleeve 37. Since the sliding ring 40 and the pilot sleeve 37 are fitted to each other, the pilot oil chamber 26 is sealed, but the hydraulic oil does not act on the piston 12 because the hydraulic oil is not supplied to the main body oil chamber 14.

Figure 4B:
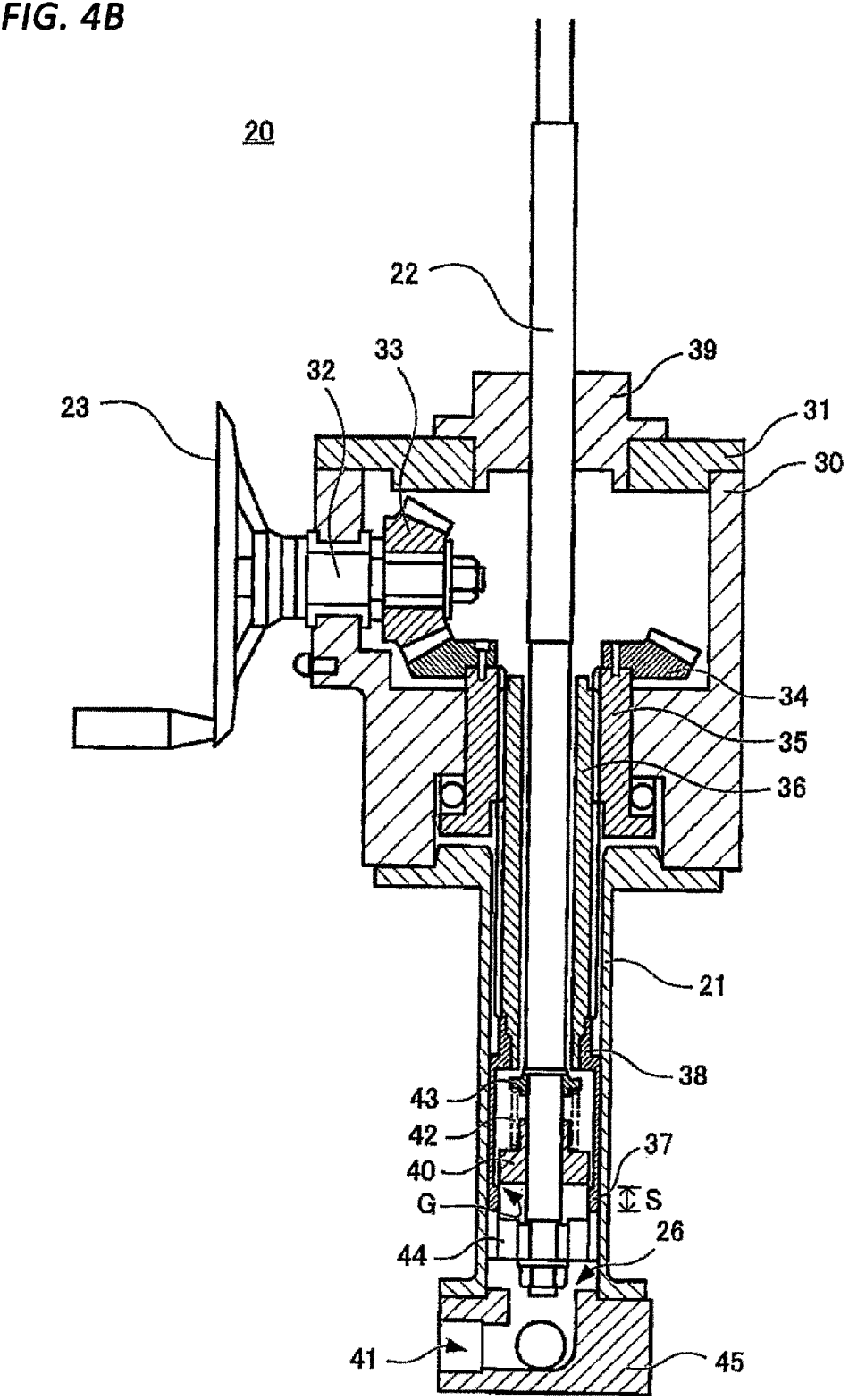
FIG. 4B is a view for explaining the detailed configuration and operation of the pilot mechanism arranged in the main stop valve illustrated in FIGS. 1 to 3.

FIG. 4B illustrates a state in which the supply of hydraulic oil to the main body side oil chamber 14 is started while the handle 23 is fixed after the state of FIG. 4A. When the hydraulic oil is supplied to the oil supply unit 15, the hydraulic oil is supplied to the pilot oil chamber 26 via the communication pipe 28, and the hydraulic oil is also supplied to the main body side oil chamber 14 via the communication pipe 27. At this time, since the pilot oil chamber 26 and the main body side oil chamber 14 communicate with each other at the communication pipe 27, substantially the same hydraulic pressure acts within the pilot oil chamber 26 and the main body side oil chamber 14. In the state of FIG. 4A, since the pilot oil chamber 26 is sealed, when the hydraulic oil is supplied to the main body side oil chamber 14, the hydraulic pressure acting on the pilot sleeve 37 and the sliding ring 40 increases. However, since the handle 23 is fixed, the pilot sleeve 37 is not raised even when the hydraulic pressure increases. The sliding ring 40 is raised when the hydraulic pressure exceeds the pressing force of the spring 42.

Further, when the supply of the hydraulic oil continues, the sliding ring 40 is relatively lifted with respect to the pilot sleeve 37, so that the sliding ring 40 is released from the section S. That is, at this time, the sliding ring 40 eliminates an engagement with the pilot sleeve 37 and exits to the upper side. At this time, a gap G is generated between the lower end of the sliding ring 40 and the upper end of the pilot sleeve 37, and the pilot oil chamber 26 is not sealed. In this state, since the hydraulic oil in the pilot oil chamber 26 leaks from the gap G, the hydraulic pressure does not increase even in the main body side oil chamber 14 that is in fluid communication with the pilot oil chamber 26 via the communication pipe 27, and therefore, the piston 12 is not raised.

Figure 4C:
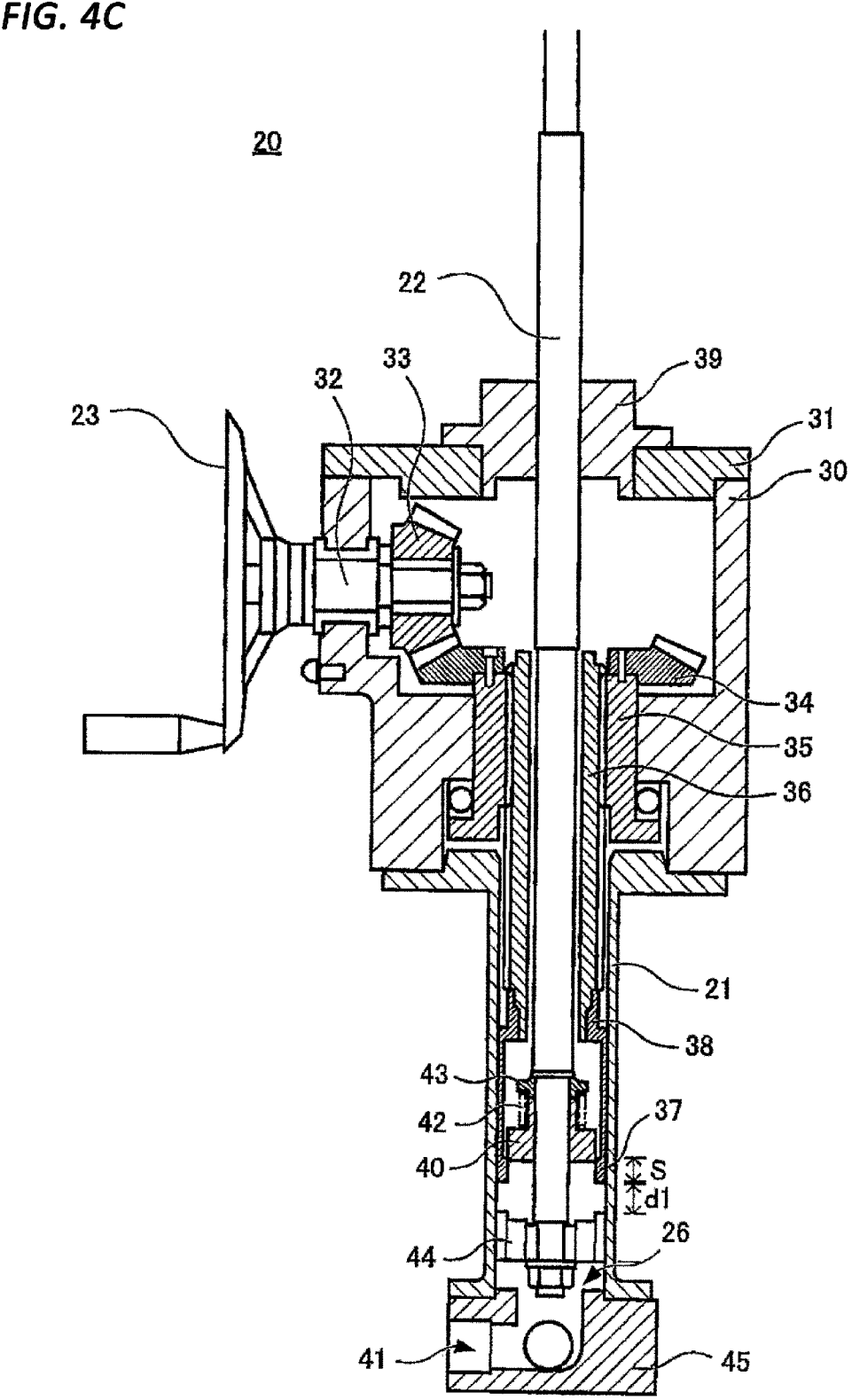
FIG. 4C is a view for explaining the detailed configuration and operation of the pilot mechanism arranged in the main stop valve illustrated in FIGS. 1 to 3.

FIG. 4C illustrates a state in which the handle 23 is rotated to raise the pilot sleeve 37 by a distance d1 after the state of FIG. 4B. When the pilot sleeve 37 is raised, the section S in which the pilot sleeve 37 may be fitted into the sliding ring 40 also moves upward. Similarly, the position of the gap G formed between the lower end of the sliding ring 40 and the upper end of the pilot sleeve 37 also moves upward in the state in which hydraulic pressure acts on the pilot oil chamber 26 (not illustrated in FIG. 4C). However, until the sliding ring 40 abuts against the stopper ring 43, the hydraulic oil leaks from the gap G, so that the hydraulic pressure in the main body side oil chamber 14 does not rise, and the piston 12 is not yet to be raised.

Further, when the operation of the handle 23 is continued and the rising distance of the pilot sleeve 37 reaches the distance d1, the sliding ring 40 abuts against the stopper ring 43 as illustrated in FIG. 4C. At this point, the sliding ring 40 may not be raised unless the rod 22 is lifted. Therefore, unlike in the past, even when hydraulic pressure acts on the pilot oil chamber 26, the sliding ring 40 is not released from the section S, and the pilot oil chamber 26 remains sealed. At this time point, the hydraulic pressure also increases in the main body side oil chamber 14, which is in fluid communication with the pilot oil chamber 26 via the communication pipe 27, and the piston 12 starts to be raised.

When the piston 12 starts to be raised, the valve rod 9 and the rod 22 are raised together with the piston 12. When the rod 22 is raised, the stopper ring 43 is raised in the pilot cylinder 21, so that the sliding ring 40 may also be raised. Here, when the operation of the handle 23 is interrupted, the lifting of the pilot sleeve 37 is stopped, and the sliding ring 40, which has continued to rise due to the hydraulic pressure, is released from the section S upwardly, and a gap G is formed again. In this state, as in the state illustrated in FIG. 4B, since the hydraulic oil in the pilot oil chamber 26 leaks from the gap G, the hydraulic pressure does not increase in the main body side oil chamber 14, and thus, the lifting of the piston 12 is stopped.

However, the gap G formed by stopping the operation of the handle 23 during the lifting of the piston 12 is closed in a short time since the sliding ring 40 on which the hydraulic pressure does not act due to the leakage of the hydraulic oil is pushed down by the pressing force of the spring 42 or the load acting on the rod 22. When the gap G is closed, the sliding ring 40 on which the hydraulic pressure acts again is raised, and the gap G is formed again. Thus, while the operation of the handle 23 is interrupted during the lifting of the piston 12, the gap G is opened and closed intermittently. As a result, during this time, the hydraulic pressure in the main body side oil chamber 14 is maintained without increasing or decreasing, and thus, the position of the piston 12 is maintained.

FIG. 4C illustrates a state in which the rod 22 is raised by a distance d2 as a result of further rotation of the handle 23 to raise the pilot sleeve 37 after the state of FIG. 4C. The distance d2 is also illustrated in FIG. 3 as the distance between the shoulder unit 16 provided on the valve rod 9 and the backseat 18 formed in the casing 2 when the piston 12 is pushed down to the lowermost portion of the hydraulic cylinder 10. Since the raising distance of the rod 22 and the raising distance of the valve rod 9 substantially coincide with each other, when the rod 22 is raised by the distance d2, the valve rod 9 is also raised by the distance d2, and the shoulder unit 16 abuts against the backseat 18. In this state, the valve body 4 connected to the valve rod 9 completely opens the steam passage 5, and the valve rod 9 is not further raised.

Figure 4D:
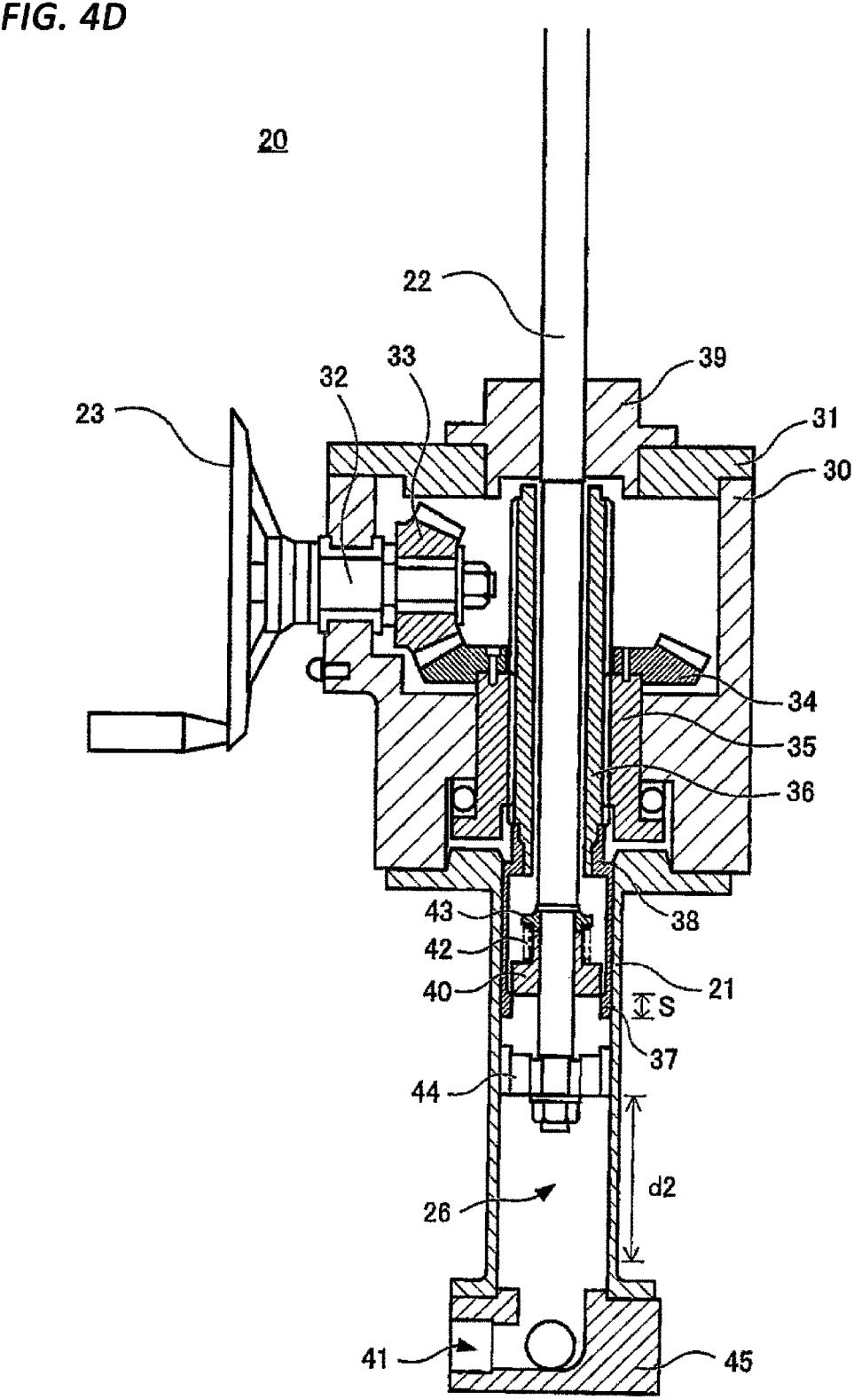
FIG. 4D is a view for explaining the detailed configuration and operation of the pilot mechanism arranged in the main stop valve illustrated in FIGS. 1 to 3.
Figure 4E:
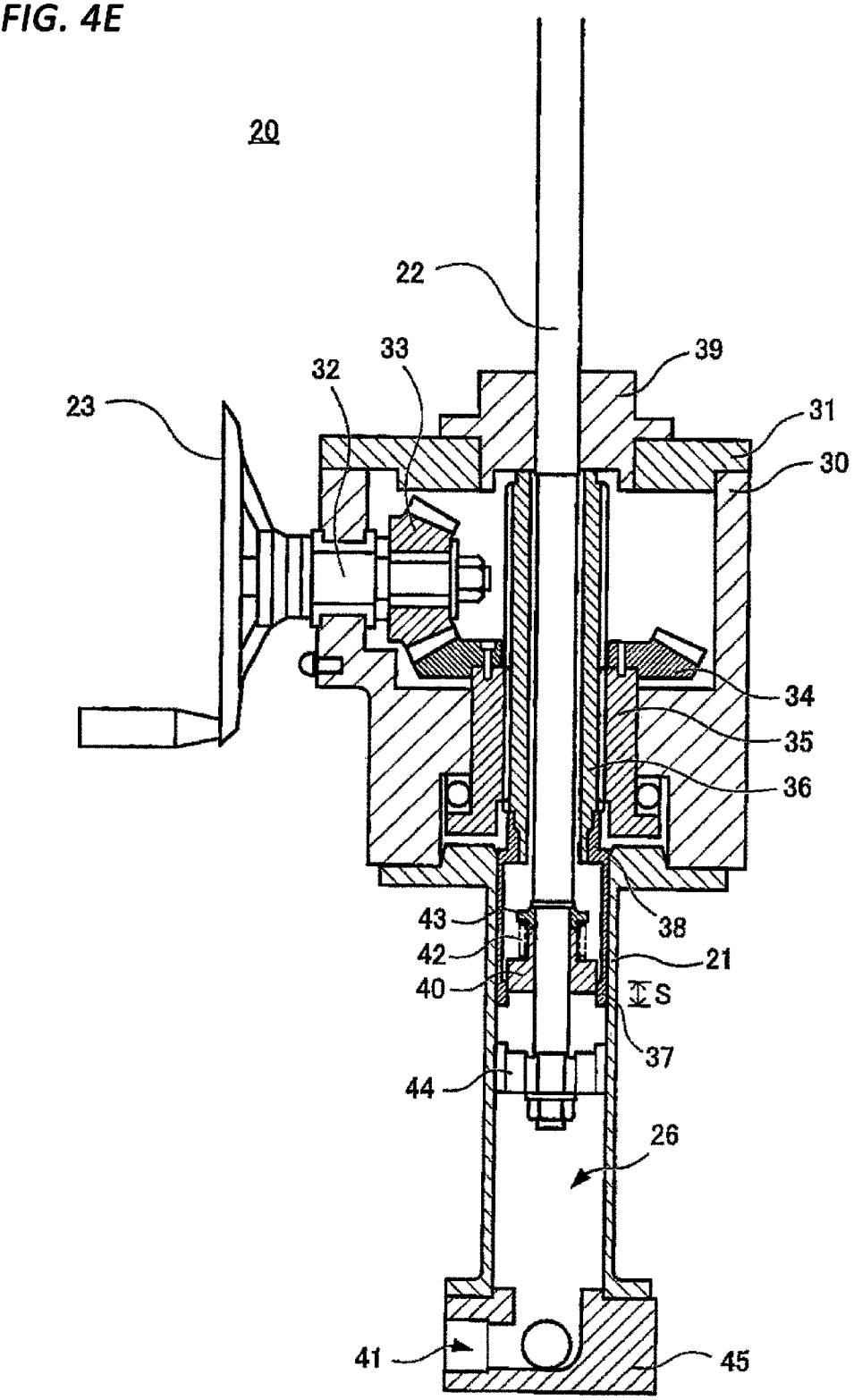
FIG. 4E is a view for explaining the detailed configuration and operation of the pilot mechanism arranged in the main stop valve illustrated in FIGS. 1 to 3.

FIG. 4E illustrates a state in which the handle 23 is further rotated to the limit after the state of FIG. 4D. The rotation limit of the handle 23 is defined, for example, by abutting the upper end of the trapezoidal threaded sleeve 36 against the gear box cover 31 or the rod bush 39, as illustrated in FIG. 4E. As described above, the pilot sleeve 37 is slidably fitted into the sliding ring 40 provided on the rod 22. Therefore, even after the rod 22 and the sliding ring 40 are not raised in the state of FIG. 4D, the pilot sleeve 37 is further raised by the operation of the handle 23 to be able to engage the sliding ring 40 with the pilot sleeve 37 more deeply.

In the state illustrated in FIG. 4D when the valve rod 9 and the rod 22 have just reached the upper end position, the sliding ring 40 is only slightly fitted into the pilot sleeve 37. Therefore, even when the pilot sleeve 37 is slightly lowered, for example, due to erroneous operation of the handle 23 during the subsequent operation, the gap G is formed again so that the hydraulic oil in the pilot oil chamber 26 may leak and the piston 12 may be lowered slightly against the intention. As illustrated in FIG. 4E, by lifting the pilot sleeve 37 even after the valve rod 9 and the rod 22 reach the upper end position, the sliding ring 40 is held in a deeper fitting state into the pilot sleeve 37 during operation, and, for example, such an unintended operation may be suppressed.

Figure 4F:
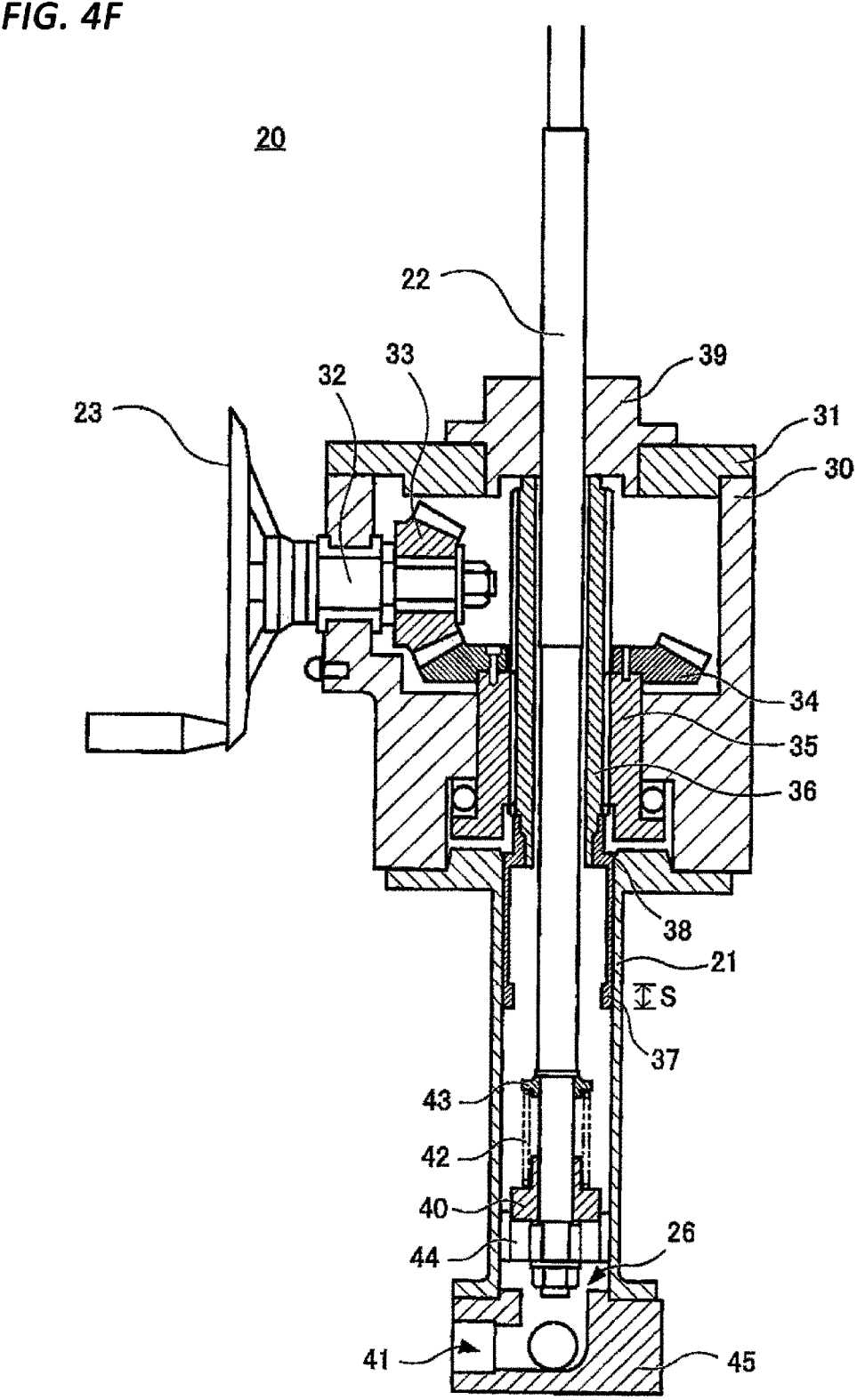
FIG. 4F is a view for explaining the detailed configuration and operation of the pilot mechanism arranged in the main stop valve illustrated in FIGS. 1 to 3.

FIG. 4F illustrates a state immediately after the tripping operation of the piston 12 after the state of FIG. 4E (i.e., an operation of being rapidly pushed down by the pressing force of the main body side spring 13 in an emergency or the like). At this time, the valve rod 9 is rapidly pushed down together with the piston 12, so that the rod 22 is pushed down to the position after the tripping, which is the same as that illustrated in FIG. 4A. As described above, since the pilot sleeve 37 is slidably fitted into the sliding ring 40 provided on the rod 22, the pilot sleeve 37 is not displaced during the tripping operation of the piston 12. In the meantime, the sliding ring 40 is pressed by the stopper ring 43 fixed to the rod 22 to pass downward through the pilot sleeve 37, and is pushed down to the position after the same tripping as that illustrated in FIG. 4A by the pressing force of the spring 42.

In this state, the pilot mechanism 20 may be returned to the reset state as illustrated in FIG. 4A by rotating the handle 23 in the reverse direction so far and lowering the pilot sleeve 37. Further, until the resetting of the pilot mechanism 20 is completed, the sliding ring 40 is held in a state of being unfitted into the pilot sleeve 37 as illustrated in FIG. 4F. Therefore, even when the supply of the hydraulic oil to the main body side oil chamber 14 is started before the resetting is completed by an erroneous operation or the like, since the pilot oil chamber 26 is not sealed, the hydraulic pressure in the main body side oil chamber 14 does not increase and thus, the piston 12 is not raised.

The detailed configuration and operation of the pilot mechanism 20 arranged in the main stop valve 1 according to the embodiment of the present disclosure have been described above. In the pilot mechanism 20 of the main stop valve 1 according to the present embodiment, the pilot oil chamber 26 in fluid communication with the hydraulic cylinder 10 is sealed while the sliding ring 40 and the pilot sleeve 37 are fitted to each other in the pilot cylinder 21, and the valve rod 9 and the valve body 4 may be lifted by applying hydraulic pressure to the piston 12 in the hydraulic cylinder 10. The pilot sleeve 37 is displaced by the operation of the handle 23 and the section S in which the sliding ring 40 and the pilot sleeve 37 are fitted to each other is appropriately moved so that the valve body 4 is lifted up to a desired position, that is, the opening degree of the main stop valve 1 may be adjusted.

Here, the connecting rod 24 configured to connect the rod 22 of the pilot mechanism 20 to the valve rod 9 in parallel, and the communication pipe 27 configured to cause the pilot cylinder 21 to be in fluidly communication with the hydraulic cylinder 10 may be both connected to the main body of the main stop valve 1 that includes the valve rod 9 and the hydraulic cylinder 10. That is, in the present embodiment, the pilot mechanism 20 may be easily separated from the main body of the main stop valve 1. This makes it possible to simplify the structure of a main body portion by minimizing, for example, the constituent elements for the pilot mechanism 20 included in the main body portion of the main stop valve 1. Further, for example, a common pilot mechanism 20 may be provided irrespective of the size or structure of the main body portion of the main stop valve 1. In addition, for example, the structure of the main body portion of the main stop valve may be made common, irrespective of the presence or absence of the pilot mechanism. When the displacement of the valve rod is automatically controlled using an actuator such as a solenoid when the main stop valve is set up, the main stop valve does not necessarily require a pilot mechanism.

Another advantage of the present embodiment is that since the pilot mechanism 20 is provided independently of the main body portion of the main stop valve 1, it is possible to replace the gears without disassembling the main body even when the gears of the drive gear 33 and the driven gear 34 are deteriorated. Since the pilot sleeve 37 is raised and lowered by the operation of the handle 23, it is possible to perform the operation at the time of setting up the main stop valve 1 with a smaller force than, for example, when the valve rod 9 is directly raised and lowered by the handle.

While the preferred embodiments of the present disclosure have been described in detail with reference to the accompanying drawings, the technical scope of the present disclosure is not limited to these examples. It will be apparent to those skilled in the art that various changes or modifications may be made within the scope of the technical idea described in the scope of claims of the present disclosure. It will be appreciated that the various changes or modifications belong to the technical scope of the present disclosure naturally.

This application is based on and claims priority from Japanese Patent Application No. 2016-116100, filed on Jun. 10, 2016. All disclosures, including the specification, claims, drawings, and abstract of Japanese Patent Application No. 2016-116100, are incorporated by reference to this application as a whole. All disclosures, including the specification, claims, drawings, and abstract of Japanese Utility Model Publication No. 02-009041 (Patent Document 1) and Japanese Utility Model Publication No. 02-009042 (Patent Document 2), are incorporated herein by reference in their entirety.

DESCRIPTION OF SYMBOLS

1: main stop valve
2: casing
4: valve body
5: steam passage
8: valve seat
9: valve rod
10: hydraulic cylinder
12: piston
13: main body side spring
14: main body oil chamber
16: shoulder unit
18: backseat
20: pilot mechanism
21: pilot cylinder
22: rod
23: handle
24: connecting rod
26: pilot oil chamber
27: communication pipe
37: pilot sleeve
40: sliding ring
41: communication port
42: spring
43: stopper ring
44: rod guide

What is claimed is:

1. A main stop valve comprising:
a hydraulic cylinder;
a piston arranged in the hydraulic cylinder;
a valve rod connected to the piston; and
a valve body connected to the valve rod and configured to block a steam passage,
wherein the main stop valve further comprises:
a pilot cylinder having a communication port in fluid communication with the hydraulic cylinder;
a rod connected in parallel with the valve rod and configured to be inserted from one end of the pilot cylinder;
a sliding ring provided on the rod; and
a pilot sleeve configured to be slidably fitted into an inner surface of the pilot cylinder and slidably fitted into an outer peripheral surface of the sliding ring in a section between the one end of the pilot cylinder and the communication port.

2. The main stop valve of claim 1, further comprising:
a handle configured to displace the pilot sleeve in an axial direction of the pilot cylinder.

3. The main stop valve of claim 1, further comprising:
a stopper ring fixed to the rod; and
a spring provided on the stopper ring,
wherein the sliding ring is slidably provided on the rod and is biased against the communication port by the spring.

* * * * *